US011364670B2

(12) United States Patent
Rehrl et al.

(10) Patent No.: US 11,364,670 B2
(45) Date of Patent: Jun. 21, 2022

(54) DEVICE AND METHOD FOR STRETCHING AND/OR SHAPING AND/OR APPLYING A LAMINATION OF A FILM ELEMENT, AND LAMINATING STATION AND APPARATUS FOR LAMINATING A COMPONENT

(71) Applicant: Lisa Dräxlmaier GmbH, Vilsbiburg (DE)

(72) Inventors: Hubert Rehrl, Teisendorf (DE); Andreas Dandl, Freilassing (DE); Andreas Jung, Laufen (DE)

(73) Assignee: LISA DRÄXLMAIER GMBH, Vilsbiburg (DE)

( * ) Notice: Subject to any disclaimer, the term of this patent is extended or adjusted under 35 U.S.C. 154(b) by 274 days.

(21) Appl. No.: 16/305,433

(22) PCT Filed: Feb. 23, 2017

(86) PCT No.: PCT/DE2017/000045
§ 371 (c)(1),
(2) Date: Nov. 29, 2018

(87) PCT Pub. No.: WO2017/215684
PCT Pub. Date: Dec. 21, 2017

(65) Prior Publication Data
US 2020/0215742 A1 Jul. 9, 2020

(30) Foreign Application Priority Data

Jun. 12, 2016 (DE) ...................... 10 2016 007 075.7
Jul. 5, 2016 (DE) ...................... 10 2016 008 095.7
Oct. 18, 2016 (DE) ...................... 10 2016 012 425.3

(51) Int. Cl.
*B29C 51/04* (2006.01)
*B29C 51/26* (2006.01)
(Continued)

(52) U.S. Cl.
CPC ............ *B29C 51/262* (2013.01); *B29C 51/04* (2013.01); *B29C 63/02* (2013.01); *B29C 51/16* (2013.01);
(Continued)

(58) Field of Classification Search
CPC ..... B29C 55/165; B29C 55/20; B29C 51/262; B29C 51/04
See application file for complete search history.

(56) References Cited

U.S. PATENT DOCUMENTS 3,466,706 A 9/1969 Kazuo
4,744,848 A 5/1988 Andrews et al.
(Continued)

FOREIGN PATENT DOCUMENTS

EP 0920975 A2 6/1999
EP 2875931 A1 * 5/2015 ............. B29C 51/46

OTHER PUBLICATIONS

International Search Report for corresponding International application No. PCT/DE2017/000045 dated Jun. 14, 2017.

*Primary Examiner* — Scott W Dodds
(74) *Attorney, Agent, or Firm* — Jacob Eisenberg

(57) ABSTRACT

The aim of the invention is to further develop conventional devices for stretching and/or shaping and/or applying a lamination of a film element. This aim is achieved, according to the invention, by a device for stretching and/or shaping and/or applying a lamination of a film element, which device comprises a support frame for gripping the film element relative to a shaping tool or to a component to be laminated, and having grippers for gripping the film element, which are mounted so as to be movable relative to the support frame, said device being characterized in that grippers are arranged in a multi-axially adjustable manner relative to the support frame in order to adapt the film
(Continued)

Figure 1:
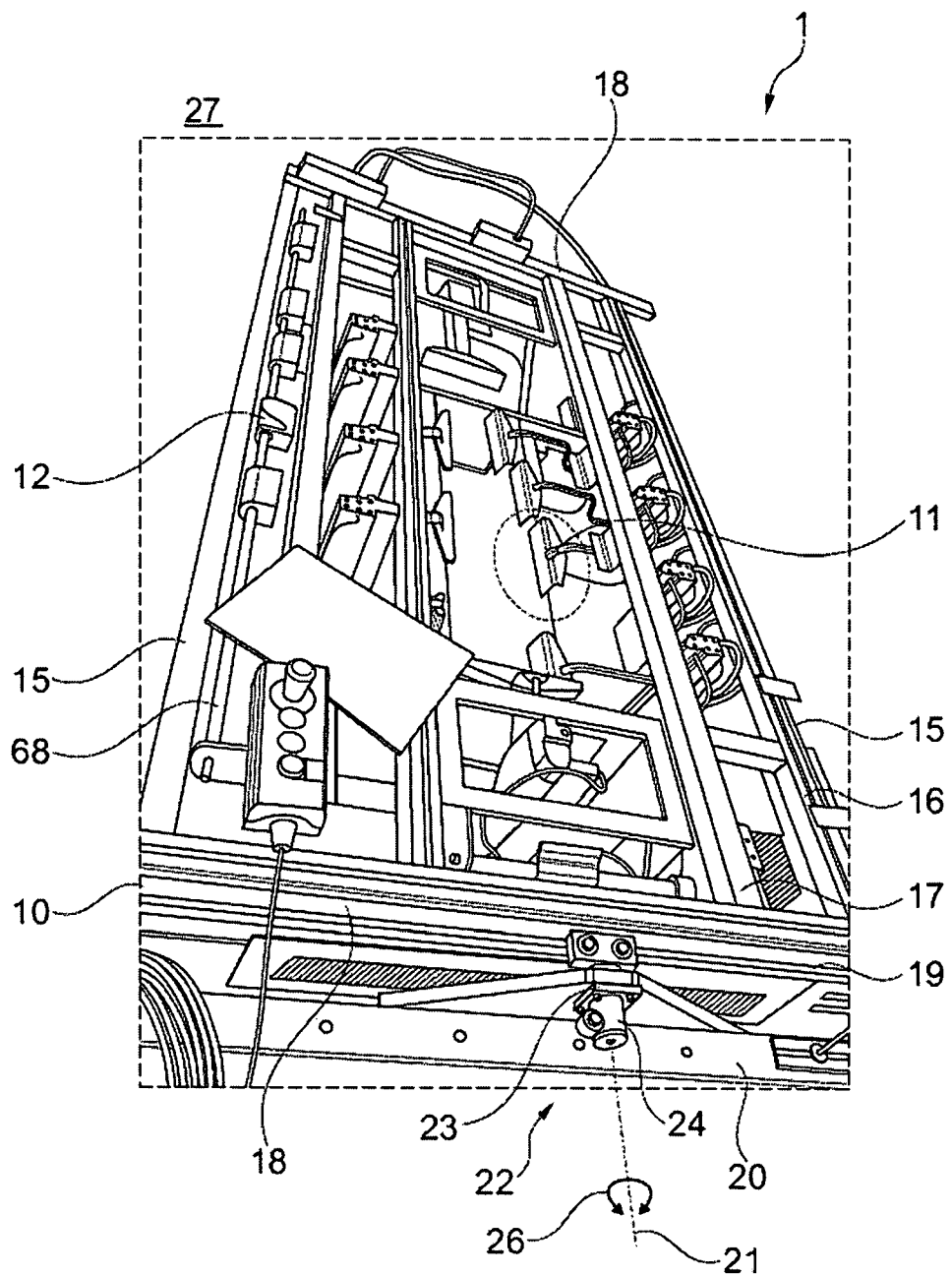

element more precisely to a contour of the shaping tool or of the component to be laminated.

15 Claims, 6 Drawing Sheets

(51) Int. Cl.
*B29C 63/02* (2006.01)
*B29C 51/16* (2006.01)
*B29C 55/16* (2006.01)
*B29L 31/30* (2006.01)

(52) U.S. Cl.
CPC ..... *B29C 55/165* (2013.01); *B29L 2031/3005* (2013.01)

(56) References Cited

U.S. PATENT DOCUMENTS

| | | |
|---|---|---|
| 5,843,492 A | 12/1998 | McCorry |
| 5,863,568 A | 1/1999 | Tomita et al. |
| 6,382,953 B1 | 5/2002 | Chun et al. |
| 2003/0017227 A1 | 1/2003 | Bibeau |
| 2014/0096897 A1* | 4/2014 | Katou ................... B29C 51/262 156/212 |

* cited by examiner

DEVICE AND METHOD FOR STRETCHING AND/OR SHAPING AND/OR APPLYING A LAMINATION OF A FILM ELEMENT, AND LAMINATING STATION AND APPARATUS FOR LAMINATING A COMPONENT

RELATED APPLICATIONS

The present invention is a U.S. National Stage under 35 USC 371 patent application, claiming priority to Serial No. PCT/DE2017/000045, filed on 23 Feb. 2017; which claims priority of DE 10 2016 007 075.7, filed on 12 Jun. 2016; DE 10 2016 008 095.7, filed on 5 Jul. 2016; DE 10 2016 012 425.3, filed on 18 Oct. 2016, the entirety of each are incorporated herein by reference.

The invention relates to a device for stretching and/or shaping and/or applying a lamination of a film element, with a support frame for gripping the film element in relation to a shaping tool or a component to be laminated, and with grippers for gripping the film element, which are mounted so as to be movable in relation to the support frame.

The invention further relates to a device for stretching and/or shaping and/or applying a lamination of a film element, with a support frame for gripping the film element in relation to a shaping tool or a component to be laminated.

The invention additionally relates to a method for stretching and/or shaping and/or applying a lamination of a film element, where the film element is retained by means of a support frame with respect to a shaping tool or a component to be laminated, and wherein the shaping tool or the component to be laminated is moved through the film plane formed by the film element, for transferring the contour of the shaping tool or of the component to be laminated onto the film element.

The invention also relates to a laminating station for laminating a component with a film element.

The invention also relates to a plant for laminating a component, in particular an automotive interior trim panel, with a film element, the plant having a laminating station and the laminating station having a support frame with a plurality of grippers for gripping the film element.

Especially devices for stretching and/or shaping and/or applying a lamination of a film element, which have a support frame for gripping the film element, but also special laminating stations and complex facilities for laminating components, which are equipped with such devices, are known from the state of the art.

From the European Patent Application EP 2 397 308 A2, for instance, a generic device for stretching and shaping a film blank is known wherein this film blank is clamped between an upper tenter frame and a lower tenter frame of a support frame and is thus retained with respect to a shaping tool. The support frame can be translated in the x, y and z directions, that is, along three spatial axes, and can additionally be rotated around a fixed point, i. e. around exactly one spatial axis, so as to guarantee a sliding of the film blank during a forming process.

From DE 699 09 835 D2, furthermore a machine for stretching and vacuum forming a rectangular panel of plastic material is known, the machine comprising a support frame with four clamping ridges, each of which can clamp one edge of the rectangular plastic panel. During this process, two clamping ridges each are opposed in pairs, each clamping ridge comprising several second clamping devices. These second clamping devices are arranged on each clamping ridge and can move longitudinally along the clamping ridge length with a low coefficient of friction, being trailed behind and by the material panel. Thus, the second clamping devices move in proportion to the movement of the clamping ridges so as to prevent boundary faults.

Although the known generic devices operate well, they reach their limits due to increasingly complex contours of prefabricated parts and ever more increasing quality requirements. This applies especially to methods where components are to be laminated with a film element, such as, for instance, interior vehicle trim panels.

The invention is therefore based on the task of further developing generic devices such that a film element can be attached or adhered more precisely to a contour of a shaping tool or of a component to be laminated. Another object of the invention is to save film material so that generic methods for stretching and/or forming and/or laminating can be carried through more economically. An additional task of the invention is to manufacture products of higher quality.

The task of the invention is solved by a device for stretching and/or shaping and/or applying a lamination of a film element with a support frame for gripping the film element in relation to a shaping tool or a component to be laminated, and with grippers for gripping the film element which are mounted so as to be movable in relation to the support frame, the device being characterized in that grippers are arranged so as to be adjustable multi-axially with respect to the support frame, so as to adapt the film element more precisely to a contour of the shaping tool or of the component to be laminated.

Due to the fact that at least some of the grippers are arranged or attached so as to be adjustable along and/or about more than one spatial axis, in particular at the support frame, the film element can be stretched and shaped relatively easily and in a substantially more targeted manner in terms of construction, adapted to the contour or the geometry, respectively; so that the film element can adapt significantly more precisely to the shape of a contour or to the geometry of a component or shaping tool in particular during a stretching and shaping process in general or a laminating process specifically. This helps to again substantially improve the quality of the finished product.

The adjustability or displaceability of the grippers described here refers to an active movement of the respective gripper, which is, in contrast to a passive movement, caused by an actuator; wherein however not all grippers need to be actively adjustable by a drive motor but can partially only be passively adjustable, for instance by means of a movement of the film element while a shaping tool or a component to be laminated is brought in contact with the film element, and/or by an active movement of the support frame.

In particular a defined sliding movement of the film element is also significantly improved with the present invention so that the film element can be treated or adapted to a contour with greater precision, substantially improving the product quality.

Advantageously, tension forces can also be controlled much better by means of which the film element is, in particular, stretched.

In the context of the invention, the term "multiaxial" describes a multifunctional spatial freedom of movement of the gripper, which is defined by several translational degrees of freedom along more than one spatial axis. These degrees of freedom can be supplemented by one or more rotational degrees of freedom, still adding one or more spatial axes. A translational movement and a rotational movement can have one common spatial axis or different spatial axes.

Thus, grippers of the present device can be three-dimensionally adjusted in space, making a film element according to the invention particularly easy to handle, especially as concerns simple application on a component to be laminated and stretching and/or shaping of the film element.

The present invention relates both to general lamination and to press lamination or the like.

In the context of the present invention, the term "film element" comprises all kinds and shapes of films, either as tape goods from a bobbin or as pre-fabricated film blanks, with pre-fabricated film blanks being preferred. Therefore, a "film element" is preferably intended to be a film blank. The film element can also be an inherently stiff panel element or the like. The film element can be furthermore made of very different materials, also in particular air-permeable materials.

In the context of the invention, the term "gripper" describes components or component assemblies by means of which the film element can be gripped in particular at the edges and can be maintained operationally reliable even under high tensile load.

For example, grippers can comprise a suction unit for gripping the film element according to the present invention.

Preferably, however, the present grippers are characterized by at least two gripping area portions displaceable with respect to one another by means of which different gripping forces or retention forces can be exerted on the film element to be gripped.

These gripping area portions can have very different shapes, for instance they can be embodied as gripping lugs with larger or smaller width.

The gripper is preferably part of a more compact gripper unit which is preferably arranged in its entirety at the present support frame. Such a gripper unit can comprise all necessary adjustment devices for adjustment, in particular spatial adjustment, of the gripper, as well as a drive motor or several drive motors for actuating the gripper.

The gripper preferably comprises at least two gripping area portions for interaction with the respective film element, i. e. portions between which the film element can be clamped and thus gripped and retained by the gripper.

In the context of the invention, the multiaxial adjustability of the grippers can refer at least partially or entirely to the gripper unit which will in this case be arranged movably on the support frame. Otherwise, the gripper will be preferably arranged, cumulatively or alternatively, on or within the gripper unit in a suitable manner, so as to be multiaxially adjustable.

In any case, the film element can be manipulated by means of the existing grippers in an extremely large number of variants.

Another possible solution for solving the task of the invention is a device for stretching and/or shaping and/or applying a lamination of a film element, with a support frame for gripping the film element in relation to a shaping tool or to a component to be laminated, wherein the device is characterized by an outer bearing frame part with respect to which the support frame is arranged so as to be adjustable at least monoaxially, preferably multiaxially, so that the film element can be adapted more precisely to a contour of the shaping tool or the component to be laminated.

By arranging the support frame bearing the film element to be stretched and/or shaped and/or laminated at least monoaxially or, preferably, multiaxially within the bearing frame part, a forming process or laminating process, respectively, can be performed with much higher precision, again significantly improving the quality of the finished product.

By a "monoaxial" arrangement according to the invention, a translational or rotational freedom of movement about a spatial axis is intended so as to move the film element, for instance, and make it adjustable in its entirety with respect to the shaping tool or the component to be laminated.

In particular, this frame-in-frame solution also makes it possible to simultaneously move or adjust existing grippers in their entirety by simple construction means, provided that the support frame is equipped with such grippers.

In general, with the frame-in-frame solution proposed here, the movable support frame on the device, in particular on a laminating station or the like, can be replaced, for instance when the support frame is to be adapted to a specific type of film or to shaping tools or components to be laminated of different sizes, or the like.

Thus, the device is characterized by an outer frame and an inner frame which are arranged so as to be movable with respect to one another.

Therefore, with the present outer bearing frame, the device can be easily and comfortably adapted after replacement of a shaping tool or component, since the support frame carried by the bearing frame part on the device is much easier and therefore faster to replace. Advantageously, the support frame does not have to be separated from its movable bearing for this purpose.

Thus, disassembly and assembly efforts are significantly reduced and the willingness is increased to precisely adapt the support frame, the grippers etc. to possibly changing requirements. This allows a very simple and customized provision of support frames, grippers or the like adapted to a respective stretching and reshaping process, with little time effort.

In this context, a preferred embodiment also provides for the outer bearing frame part to be supported exchangeably in the device by means of a replacement mechanism, which allows replacement to be performed even more easily and faster.

Whereas the support frame is fastened so as to be movable in one or more directions with respect to the outer bearing frame part or to the outer bearing frame part, respectively, the outer bearing frame part itself can be fastened by much simpler bearing units in a frame of the present device.

It goes without saying that such a replacement mechanism or fast replacement mechanism, respectively, can be constructed in very many different ways so that it is not necessary to go into details.

The replacement mechanism or fast replacement mechanism differs from a conventional fastening mechanism substantially by the fact that replacement can be performed without tools. In other words, the bearing frame part, but also the grippers or gripper units, respectively, are fastened to the device such that they can be replaced by means of quick gripping or quick clamping units, for example in case of a change of format.

For instance, the replacement mechanism or fast replacement mechanism comprises positive engagement connections, such as simple plug-in connections, for example.

At this point, it should also be mentioned, however, that the features of the solutions described here or in the Claims can also be combined, if so desired, such that the advantages and effects to be achieved can be combined as well.

It is advantageous if the film element plane of the film element is displaceable with respect to a bearing frame part plane of the outer bearing frame part for supporting the support frame.

Especially if the film element is only clamped by means of an upper frame part and a lower frame part of the support frame in a simple manner in terms of construction, the film element plane tensioned through the film element can be moved with respect to the bearing frame part plane created by the outer bearing frame part, which allows a more precise adaptation of the film element to the contour of a shaping tool or of a component to be laminated.

In this connection, it is also particularly advantageous if the support frame is adjustable in space with respect to an outer bearing frame part with at least one or more, preferably six, degrees of freedom. This makes it possible to move or displace all grippers supported by the support frame together three-dimensionally.

Whereas it is relatively easy to implement one degree of freedom, for instance by means of a rotational axis, several degrees of freedom can be implemented e.g. with more than one servo-motors or the like by means of which the support frame is movably fastened to the outer bearing frame part.

With an increasing number of degrees of freedom, the support frame can be positioned more precisely with respect to a contour of a shaping tool or a component to be laminated; however, with more degrees of freedom, the complexity of the bearing mechanism with respect to the outer bearing frame part increases as well.

Often one degree of freedom of the support frame with respect to the outer bearing frame part is sufficient, for instance for a rotational movement about a spatial axis, especially if the support frame is cumulatively equipped with multiaxially movable grippers according to the invention.

However, the requirement on a multifunctional spatial freedom of movement of the grippers can be maintained simple in terms of construction, for instance if the support frame has two degrees of freedom with respect to the outer bearing frame part. For example, the support frame can be movable both translationally along a spatial axis and rotationally about this axis, or it can be supported by the outer bearing frame part so as to be rotationally movable about two spatial axes.

A particularly preferred embodiment, however, provides for the grippers for gripping the film element to be spatially adjustable with respect to the support frame and/or the outer bearing frame with at least two or more, preferably six, degrees of freedom. It is understood that in this manner, the film element can be attached to a contour with great precision, allowing particularly complex stretching and reshaping processes for the film element.

This complexity can again be increased if grippers for gripping the film element are borne together by the support frame, especially if the support frame is arranged so as to be rotationally and/or translationally displaceable in space. This is especially easy to achieve if the support frame is arranged movably within an outer bearing frame part, as has been described above by way of example.

In addition, the film element can be adapted with particular precision to a contour of a shaping tool or a component to be laminated if the grippers for gripping the film element can be actively controlled individually. The grippers are arranged at the support frame so as to be actively controllable individually.

In this context, the term "actively controllable" refers to the fact that the grippers are driven by motors, distinguishing them from passive grippers which are simply moved, for instance, by means of tensile forces which act upon them via the film element, or the like; wherein however the latter is possible as well by means of a suitable "idling function" of a gripper.

Actively controllable grippers can be actively moved multiaxially so as to be movable with several degrees of freedom by means of motors.

In this manner, it is possible, for instance, to process a film element even before the shaping tool or the component to be laminated has been moved through the film element plane, such that regions of the film element in more planar areas of the contour are stretched more than regions of the film element in areas with a substantially higher contour; since in these higher areas more film material should be available than in more planar areas of the contour.

Especially with regard to the mass of shaping components to be produced or components to be laminated, this can help to save large amounts of film material, which makes manufacturing of such products substantially less expensive.

In addition, this results in products of higher quality since the film element can be adapted more precisely to the respective contour, as has already been explained above on several occasions.

This excellent partial adaptability is substantially achieved by significantly improved sliding possibilities thanks to the grippers which can be individually controlled, also in combination with the adjustable support frame which is in turn supported in an outer bearing frame part preferably with quick exchange.

It is also advantageous if grippers are actively controllable individually in dependence on other grippers. In particular, grippers can be translated or accelerated with a velocity adapted to that of the movement of other grippers.

In this context, it is furthermore advantageous if mutually opposite grippers, in particular arranged on opposite front faces, are actively controllable individually, which provides additional possibilities of individual and partial manipulation of the film element.

Furthermore, it is also advantageous if grippers are actively controllable individually in pairs or in groups. In this way, even larger areas of the film element can be partially stretched; or first grippers can partially stretch the film element, whereas other grippers yield to the tensile forces acting on the film element.

Other especially advantageous possibilities of manipulation also result from the following features:

It is advantageous if grippers can be actively controlled individually in dependence on a spatial position of the support frame. Thus, grippers can be driven differently, especially if the spatial position of the support frame is varied, such that for instance first grippers can partially stretch the film element whereas other grippers yield to the tensile forces acting on the film element.

It is also an advantage if grippers can be actively controlled individually in dependence on a contour or geometry of the shaping tool or of the component to be laminated.

If grippers are actively controllable individually in dependence on a material of the film element, advantageous effects can be achieved or enhanced as well.

If grippers for gripping the film element are in addition individually controllable in terms of timing, the film element can also be partially manipulated during a shaping or laminating process by means of grippers in such a way that different regions of the film element can be stretched at different points in time; for example if it has already partially conformed to the contour in other regions.

For instance, movements of grippers can start at different times, and/or movements which were stopped before can restart at different times.

An improved preparation or adaptation of the film element to a contour can be achieved, for example, if grippers for gripping the film element can be inclined with respect to the film element plane.

By inclination, the film element can partially be displaced from the original film element plane by means of one or more grippers, such that an improved partial adaptation of the film element to a contour can be guaranteed.

Such an inclination of the grippers with respect to the film element plane can, in terms of construction, be easily achieved by arranging the grippers on the support frame such that they can be tilted, which also makes them able to be inclined with respect to a virtual support frame plane spanned on the support frame.

It is additionally advantageous if the grippers for gripping the film element are rotatable with respect to the film element plane.

For instance, grippers can be arranged on the support frame in such a way that they can be rotated around a spatial axis or rotational axis, respectively, wherein this spatial axis can for instance be arranged in parallel or perpendicular or at some other angle to a virtual support frame plane of the support frame. Thus, grippers can be inclined with respect to this virtual support frame plane spanned on the support frame.

By means of such an ability to be rotated, it is also possible to guarantee a partial application of additional tensile forces within the film element, which facilitates partial stretching of the same, for example.

Further, it is also advantageous if grippers for gripping the film element can be individually adjusted in height with respect to the film plane since such an individual adjustability in height also facilitates the adjustment of individual regions of the film element to very different conditions in terms of the contour of a shaping tool or a component to be laminated.

For instance, grippers can be arranged on the support frame so as to be adjustable in height either individually or all together.

This also results in individual adjustability in height of the grippers with respect to any bearing frame part that may be present.

Additionally, it is advantageous if the grippers for gripping the film element can be accelerated individually such that different regions of the film element can be processed and, in particular, stretched with more or with less speed, facilitating an adaptation of the same to a contour more precisely.

Cumulatively or alternatively, it is also possible that grippers are moved at different velocities in order to achieve various effects.

In addition, another preferred embodiment provides for the gripping forces to be applied by the grippers of the film element to be able to be generated and altered individually. For instance, some regions of the film element can be clamped with less force than others so that in the regions with lesser clamping forces, the film element can slide with respect to the gripper, causing or enhancing effects similar to those that are caused or enhanced when the respective gripper is displaced.

Advantageously, the device has a plurality of adjusting units for the spatial adjustment of grippers and/or the support frame. If several such adjusting units are present, a high precision in terms of adjustment processes etc. can be achieved.

For this purpose, adjusting units for the grippers are arranged at the support frame. Adjusting units for moving, adjusting or displacing the support frame with respect to the outer bearing frame part can be arranged both on the support frame and on the outer bearing frame part.

The adjusting units can be constructed in many different ways; for instance they can comprise pneumatic or hydraulic cylinders, electric motors or the like.

It is a particular advantage if the device is characterized by drive motors for driving grippers and/or the support frame.

The electric drive motors can also be of many different kinds and can, for instance, be linear motors.

These motors may be servomotors for a stepwise adjustment of grippers or of the support frame, but also servomotors for a continuous driving or adjustment of the grippers and/or of the support frame are possible.

It is understood that a plurality of very different adjusting units or drive motors can be provided in order to implement the desired degrees of freedom of the grippers or of the support frame, respectively.

Therefore, many different spatial positions of the grippers or of the support frame can be implemented as well.

It is understood that each gripper can be equipped with its own drive motor or adjusting unit.

Other concepts, however, can provide for two or more grippers, in particular grippers directly adjacent to one another, to be actively controlled individually by one single drive motor, with one or more suitable gear motors being arranged between the respective grippers and the drive motor. In this case, the grippers are not directly operatively connected to an electric drive motor, but indirectly via an intermediate gear.

The electric drive motors can be part of a gripper unit, where in a preferred embodiment, the drive motors are arranged at the support frame and preferably mounted in a floating manner. This can help to reduce complexity of a gripper unit, and in addition, the drive motors are easily accessible from outside.

At this point, it is also to be mentioned that the presently disclosed individual active adjustability can also refer to entire gripper units comprising the respective gripper.

In addition it is advantageous that in particular by means of the present device more homogeneous stretching, particularly of a heated film element or of a plate element, is possible, even with very rugged shapes or components to be laminated.

Thus, additionally, in a further aspect of the invention, a device is advantageous which comprises an additional preparatory stretching frame which at least partially surrounds the shaping tool or the component to be laminated and which can be extended upward over the shaping tool or the component. Such an additional preparatory stretching frame for stretching the heated film element can help to achieve much more homogeneous stretching, with respect to preparatory blowing, for example, of that film element region which is not to conform to the shaping tool or the component until a later point in time.

The additional preparatory stretching frame can also comprise a metal plate element, with the preparatory stretching frame or the metal plate element being driven out in advance from a tool so as to be able to pre-stretch a defined region of the film element. The present grippers provide even more additional adjusting possibilities for such a process.

An additional preparatory stretching frame which only partly surrounds the shaping tool or the component is advantageous if there are protrusions only in a limited region of the shaping tool or the component to be laminated.

In addition to a supplementary pre-stretching frame, a pre-blowing box can be provided beneath the support frame or the bearing frame part, respectively, or a pre-suction bell can be arranged above the support frame or bearing frame part, respectively, so as to pre-stretch the film element.

If, on the other hand, such protrusions are distributed over the entire shaping tool or the entire component to be laminated, it is advantageous and useful if the additional pre-stretching frame is closed over the entire circumference and includes the shaping tool or the component. In this manner, homogeneous stretching of the film element over the entire area of the shaping tool or the component can be guaranteed.

Respective tests have shown that in the state of the art, the film was stretched by more than 100%, whereas with use of the additional pre-stretching frame, a film expansion of 70-80% was measured.

Pre-blowing or pre-suction were not employed since they are often not necessary.

Nevertheless, there can be applications in which use of a pre-blowing box or a pre-suction bell can be useful if an additional closed circumferential pre-stretching frame is employed.

The task of the present invention is also solved by a method for stretching and/or shaping and/or applying a lamination of a film element in which the film element is retained by a support frame with respect to a shaping tool or a component to be laminated, and where the shaping tool or the component to be laminated moves through the film plane created by the film element, so as to transfer a contour of the shaping tool or of the component to be laminated onto the film element, wherein the grippers are translated with respect to the support frame along at least two spatial axes, and/or rotated about at least one spatial axis, and/or the support frame is rotated with respect to a bearing frame part about at least one spatial axis and/or is translated along at least one spatial axis, so as to move the film element to the contour and to adapt the film element more precisely to the contour of the shaping tool or of the component to be laminated.

In this context, it does not matter whether the displacement takes place about one spatial axis or about different spatial axes.

In any case, film elements can be adapted much more precisely to different contours of shaping tools or of components to be laminated by means of this method.

Grippers or the support frame, respectively, can individually be actively moved at different stages of the method.

A preferred embodiment provides for the grippers and/or the support frame to be translated and/or rotated while and/or after the shaping tool or the component to be laminated has/have been moved through the film element plane. This helps to adapt the film element even more precisely to the requirements of the stretching, forming or laminating process, respectively.

Another particularly advantageous version of the method provides for the grippers and/or the support frame to be replaced by means of the outer bearing frame part, which facilitates an adaptation of different grippers or different support frames to various film elements, shaping tools or components to be laminated, respectively.

The present method is preferably characterized in that the grippers or the support frame, respectively, can individually be actively controlled so as to adapt the film element more precisely to a contour of a shaping tool or of a component to be laminated.

As has already been explained above, the grippers can be individually controlled with different timing so as to be able to move, for instance, at different points in time, and/or to continue moving after having stopped, so as to be accelerated individually and/or to be moved at different velocities.

For this purpose, grippers can be both rotated and translated about one or more spatial axes, where by a rotational movement, a tilting of the grippers can be intended as well as a turning motion.

In particular, grippers can move along a path, especially a predetermined path, in multiple stages so as to affect the film element at individual points in time.

In addition, it is advantageous for grippers to be able vary their gripping or retention forces individually; that is, they increase or decrease their clamping forces or pressing forces, respectively, which act on the film element, between the gripping area parts of the grippers.

For instance, a spatial axis along which a gripper can be translated, or around which a gripper can be rotated, can extend transversely to the longitudinal axis of a frame part of the support frame on which this gripper is arranged.

Setting individual gripping forces is especially advantageous in the case of film elements with grained surfaces, to the effect that even film elements with grained surfaces can easily slide between two gripping area parts of a gripper if the gripping forces are accordingly reduced.

For being able to partially manipulate the film element in a different way, it is advantageous if a gripper or a group of grippers can be controlled individually in dependence on at least one other gripper.

The film element can be partially be stretched with even more precision if the grippers are shifted in space in dependence on a spatial position or a spatial displacement of the support frame.

The quality of the finished product can be further improved if grippers are actively controlled individually in dependence on a film material of the film element.

Another preferred embodiment provides for the grippers to be actively controlled individually in the sense that some areas of the film element are partially pre-stretched and/or partially slip such that the film element can be applied particularly well on a shaping tool or on a component to be laminated, respectively.

In addition, the present method can advantageously be developed further if the support frame is displaced in space in dependence on a spatial displacement of the grippers, since this helps to make the method even more precise.

If grippers are actively controlled individually in dependence on a contour or a geometry of the shaping tool or of the component to be laminated, the grippers can manipulate and, especially, stretch the film element with partial improvement in certain regions.

The task of the invention is also solved by a laminating station for laminating a component with a film element, the laminating station being characterized by a device with one of the features described here.

By use of the present device in a forming station in general, as in a laminating station in particular, components laminated with a film element, in particular automotive inner lining components, can be manufactured with extreme precision and thus forming products of extraordinarily high quality.

Furthermore, the task of the invention is also achieved by a plant for laminating a component, in particular an automotive inner lining component, with a film element, the plant having a laminating station and the laminating station comprising a support frame with a plurality of grippers for gripping the film element, where the plant has a controller unit which is operatively connected to at least one of the grippers in such a way that before and/or during lamination of the component with the film element, the controller unit controls the spatial movement and/or the retention forces of the at least one gripper.

Due to the ability to control grippers for gripping the film element in this way by means of the controller unit, laminating processes in generic plants can be performed in a much more targeted manner, that is, with even higher precision than before, which helps to achieve an optimization in terms of material consumption and laminating quality.

A suitable controller unit can have many different embodiments, in particular by using a combination of software and hardware.

By means of such a controller unit, active movements of grippers and/or of the support frame cannot only be controlled but also subjected to complex closed-loop control so as to be able to manipulate the film element in a more targeted manner.

With the controller unit, preferably a menu-assisted adjustment at film blanks during retrofitting of the device, in particular of the laminating station or the plant, respectively, is also possible, for instance in case of a change of format or the like.

This menu-assisted adjustment can, however, can also be achieved by means of other suitable computer-assisted units.

By a menu-assisted adjustment according to the invention, loading of a respective data set—which can be predetermined, acquired from a model, via a scanner or the like—is intended where especially the grippers, but also, cumulatively or alternatively, the support frame automatically adjust themselves to match a required or desired format size.

Alternatively, blank dimensions or the like can also be manually entered by operating staff in a controller or the like via a suitable interface.

It is understood that the controller unit can be assigned to the device, the laminating station or the plant so as to be able to individually control the grippers and support frame according to the invention.

It is also pointed out that the terms "adjusting", "displacing" and "moving" are used synonymously in the context of the present invention.

It should also be pointed out here that the invention not only refers to the device described, the described method, the described laminating station and the described plant, but also to a product manufactured with the same.

Such a product might be, for instance, a bathtub, a container inside a refrigerator or the like.

In the present case, respective film blanks (film elements) which are treated especially by means of vacuum forming can be stretched biaxially with particular precision before forming, which can help to make the film thinner or thicker even before forming in particularly precisely defined areas.

Especially in the manufacture of interior vehicle components such as instrument panels, lateral door trims or the like, the degree of drawing of the surface structure can be influenced with extremely high precision.

In the present case, it is furthermore advantageous if during and/or after forming, a forming aid is employed which can act on the film element from the outside while a shaping tool or a component to be laminated acts from the inside.

Additionally, according to a further aspect of the invention, it is advantageous if the present method is further developed by having at least one marking of a heated film element which is detected within the device or the laminating station by one sensor assigned to the marking and arranged at the inlet and one sensor assigned to the same marking and arranged at the outlet of the forming station, with the control signals from the sensors causing a relative displacement between the film element on the one hand and the shaping tool or the component to be laminated on the other hand within the device or laminating station, such that in particular working with an inline method, that is, with a film transported in steps, in particular a coherent film, is facilitated.

Advantageously, in this manner, especially a bicolor blank can be positioned with even greater precision by means of the grippers, wherein in particular the position of a color separating line can be influenced particularly precisely by means of the present grippers.

If necessary, the position of the marking can in advance be recorded by means of a sensor and can be adjusted with regard to a transport unit which is equipped accordingly.

To do this, first the marking can be adjusted in such a way that even by only using the transport unit, the labelled film element can be assigned to the shaping tool or the component to be laminated with sufficient precision. In the present device or laminating station, a precise adjustment will then be performed after heating of the film element by means of sensors arranged at the input and at the output of the device or laminating station, since heating may change the precise assignment of the marking to the shaping tool or the component.

During further processing, the film element can then be clamped and formed in the actual operating area of the device or the laminating station, with the position of the marking being monitored by at least one sensor and corrected, if required, after forming.

In another advantageous embodiment, the position of the marking can be corrected by retaining the film element in the controlled area and by corresponding displacement of the film element together with the retention means, such as the present grippers, with the clamping remaining unaltered.

That is, displacement of the film element for the purpose of correcting the position of the marking takes place by displacing the retention means, i. e. in particular the grippers, such that in this case, the clamping position of the film element is not changed via the retention means or grippers.

In a further development of the invention, the position of the marking can be corrected by a displacement of the shaping tool or of the component to be laminated if this is easier in terms of construction than displacing the transport unit together with the film.

For completing this operation process, after adjustment of the marking, the film element, while retaining its adjusted position, can be formed in a shaping tool, and in case of a laminating process, the component can be introduced in the preformed film element and combined with it.

The described method according to the other aspect is always applicable if the film element is divided into at least two surface areas by means of the marking. These areas can have, for example, different colors and be separated by a sharp line. The marking, however, can also be a color mark which is distinguished from the other colors of the film element.

The marking can also be a blind embossing, that is, the film element can have a recess or a protrusion forming the marking without being distinguished by color.

The marking can continuously extend crosswise or inclined to the film feed direction; it is also possible, however, that is extends continuously in the film feed direction.

The method, supplemented with this additional aspect, can easily be performed by a device with a transport unit if a control unit for recognizing the marking and adjusting the film element with respect to the transport unit is provided at the input of the transport unit, if at least one clamping bar or gripper and a sensor triggered by the marking are arranged both at the input and at the output of the device or of a forming station, and if adjustment devices triggered by signals of the sensors for relative displacement of the clamped film element are provided with respect to the shaping tool or the component to be laminated.

The smaller the shaping tool or the component to be laminated, the higher the precision of positioning the marking with respect to the shaping tool or the component will be.

In another aspect of the invention, especially the present method can again be further developed if, starting from a state of the marking which has been adjusted with respect to the shaping tool or the component, the film element is subjected to a forming process, after which the position of the marking is monitored by at least one sensor and is corrected, if necessary. That is, the starting point is a condition in which the film element is already in an adjusted state with respect to the transport unit and in which it is also in an at least approximately adjusted condition with respect to the shaping tool or the component to be laminated in the device or the forming station or laminating station, respectively. That is, the position of the marking is corrected here before and during a forming process, i. e. after the marking of the heated film element has already been adjusted with respect to the shaping tool or the component. This means that the position of the marking with respect to the shaping tool or the component can be corrected in case a displacement has occurred because of the forming process.

It is particularly advantageous that in this manner, insertion of the film element can be simplified and seams, colored areas or the like can be positioned with particularly high precision.

Preferably, the position of the marking is corrected by retaining the film element in the controlled area and appropriately shifting the film element in itself while the clamping remains unaltered. Such a correction is a kind of fine adjustment in which the marking is displaced by exploitation of the formable state of the film element without alteration of the clamping; that is, the marking is displaced within the film element due to the ability of the film element to be deformed, without a displacement of the entire film area, which was already performed in a previous method step, not described here, and which represented a kind of rough correction.

If this displacement in itself does not lead to the desired result, in a different embodiment, the position of the marking can be corrected by shifting the shaping tool or the component to be laminated, which helps to correct larger errors than displacing the marking within the film element.

After this correction, at least portions of the film element can be fixed into position so as to exclude other influences on the film element which might lead to a displacement of the marking with respect to the shaping tool or the component.

When the marking has been fixed into place, the actual forming or laminating process can begin which consists in forming the film element, after adjustment of the marking and after fixation of the element, in a shaping tool while maintaining the film element's adjusted and fixated position, and that in case of a laminating process, the component is inserted and combined with the pre-formed film element.

This method is always applicable if the film element is divided into at least two surface areas by at least one marking, as was already explained in combination with other possibilities whose principles also apply here.

A device adapted accordingly for performing the method according to the other aspect is particularly characterized by the fact that in the device or the forming station, at least one suction unit, such as e.g. a suction bar, is arranged above the film element so as to be adjustable in height, and that the device or forming station has a displacement drive which is controllable by means of signals from a sensor responding to the approach of the film element. The height adjustability of the suction unit is advantageous, among others, because it helps the unit to track the forming of the film element without disturbing the fixed position of the marking.

That the suction unit itself cannot cause disturbances of the marking's position during forming of the film element, this is ensured by arranging at least one suction unit at an acute or right angle to the longitudinal film direction in a movable way. The suction unit has a displacement drive controllable by signals from a sensor responding to the marking. This helps the suction unit, which retains the film element and fixes the marking into position, in following the forming process of the film element so far as it is useful as a displacement of the marking with respect to the shaping tool or the component to be laminated is to be avoided.

Furthermore, in an advantageous embodiment, suction units should be arranged in the device or forming station, respectively, at least in some regions above the film element so as to be adjustable in height and/or displaceable at an acute or right angle to the longitudinal film direction, which units fix the film element into position after the marking position has been corrected. These units are suction units which's only function it is to fix the film element into place and are therefore preferably arranged at least in some sections, since it is often not necessary to perform a fixation over the entire length or width of the film within the device or forming station.

If, as an alternative, all suction units have one drive each for height adjustment and for an inclined or perpendicular displacement with respect to the longitudinal film direction, where height adjustment and displacement by controlling the drives of the forming speed of the film element during preforming, it is possible to retain the film element also during the forming process and to fix it into place, without disturbing the position of the marking, which has already been adjusted.

With the present invention, general handling of a film element without straining and deformation have been substantially improved and in particular, partial or selective pre-stretching of individual regions of a film element is possible with particular precision.

Therefore, it is especially advantageous if the grippers are adapted for partial pre-stretching or for partial sliding, respectively.

Furthermore, the invention cannot only be employed for film blanks but also for in-line processing methods and in-line plants, where instead of blanks, processing from a bobbin is possible as well. Film blanks can also be inserted in in-line plants.

Other features, effects and advantages of the present invention are explained by means of the subsequent specification and the included drawings, in which by way of example, a device for stretching and/or forming and/or laminating a film element with grippers, arranged opposite a support frame and movable multiaxially in space by translation and/or rotation, and with a support frame arranged opposite an outer bearing frame part, which additionally is rotatable monoaxially in space, is shown and described.

Components in the individual figures with at least substantially the same functions can be designated by the same reference numbers, where the components do not need to be indicated and explained in all figures.

Figure 2:
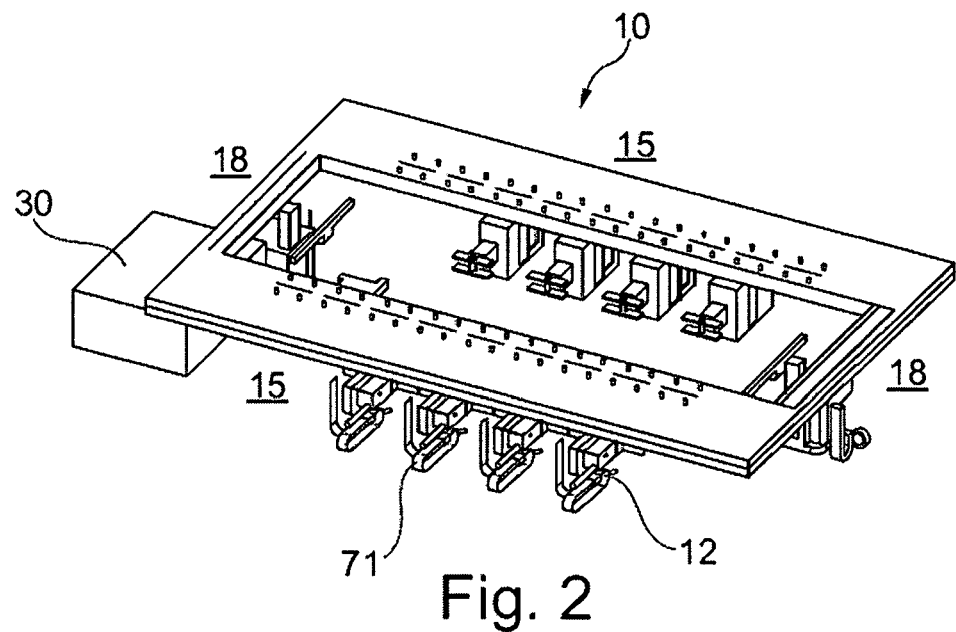
Figure 3:
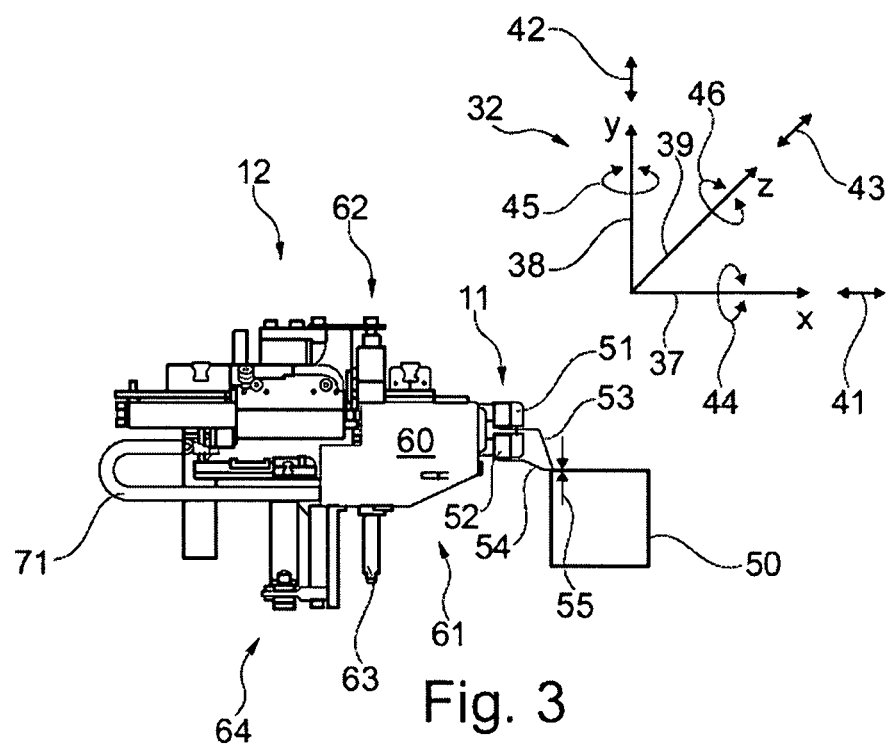
Figure 4:
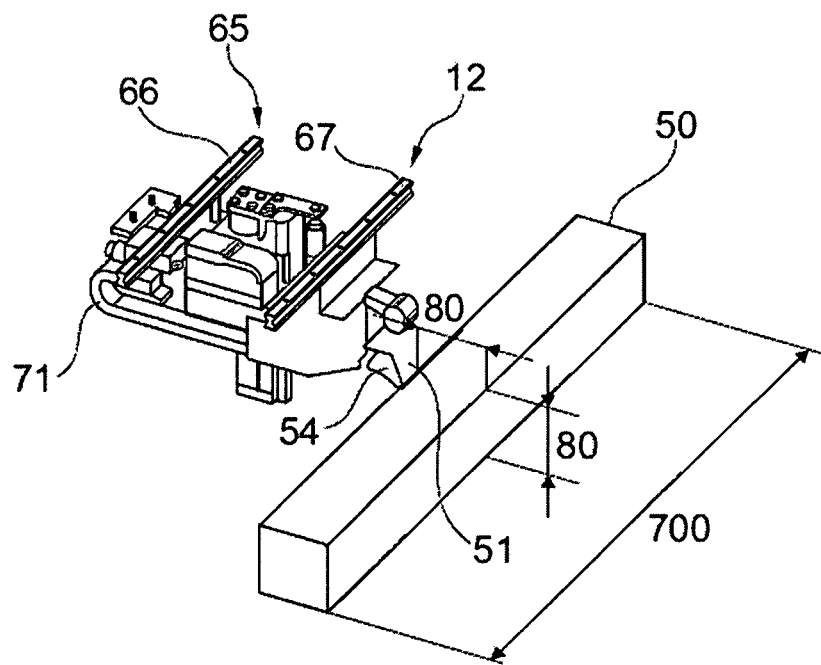
Figure 5:
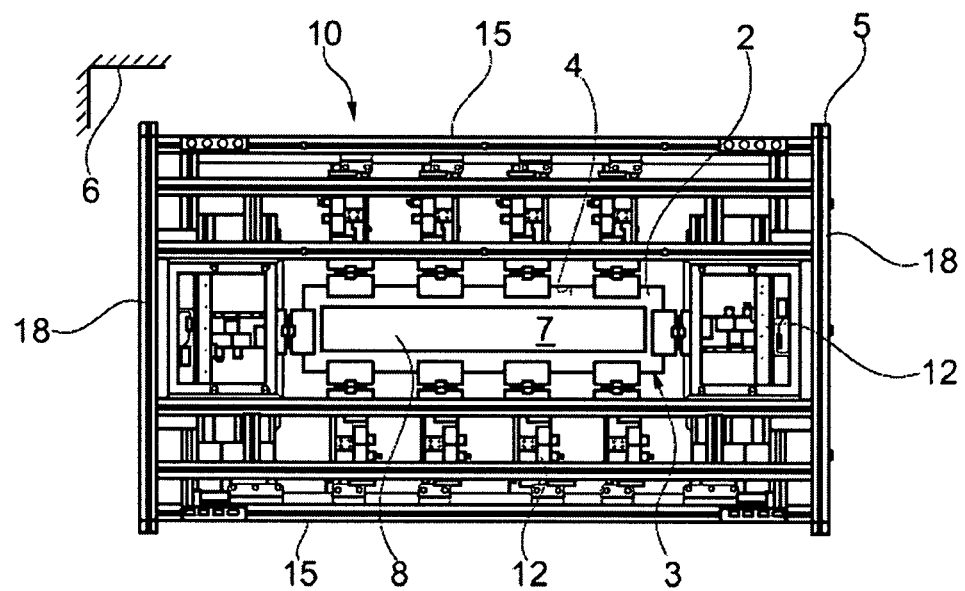
Figure 6:
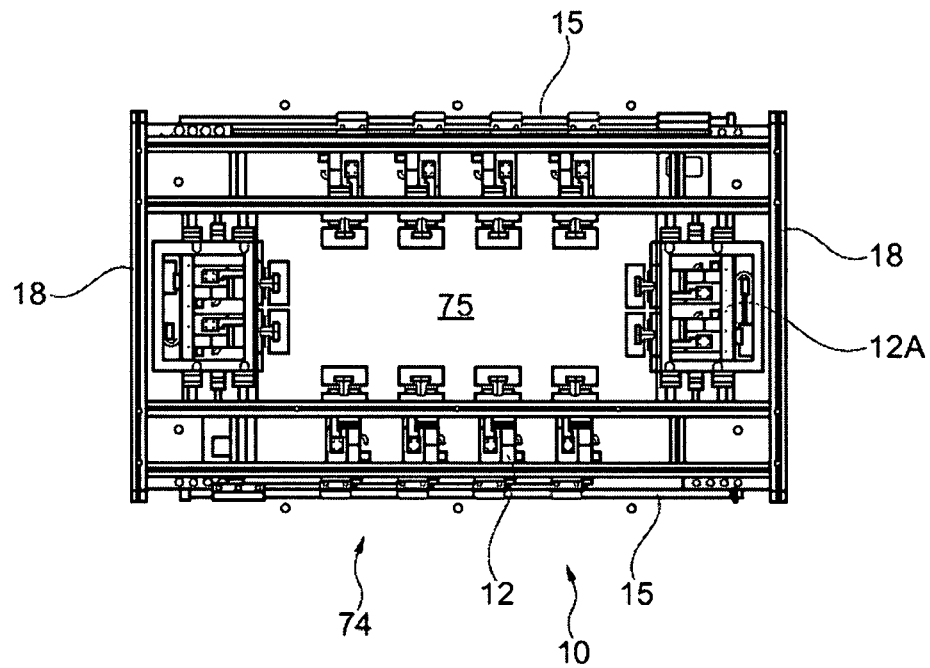
Figure 7:
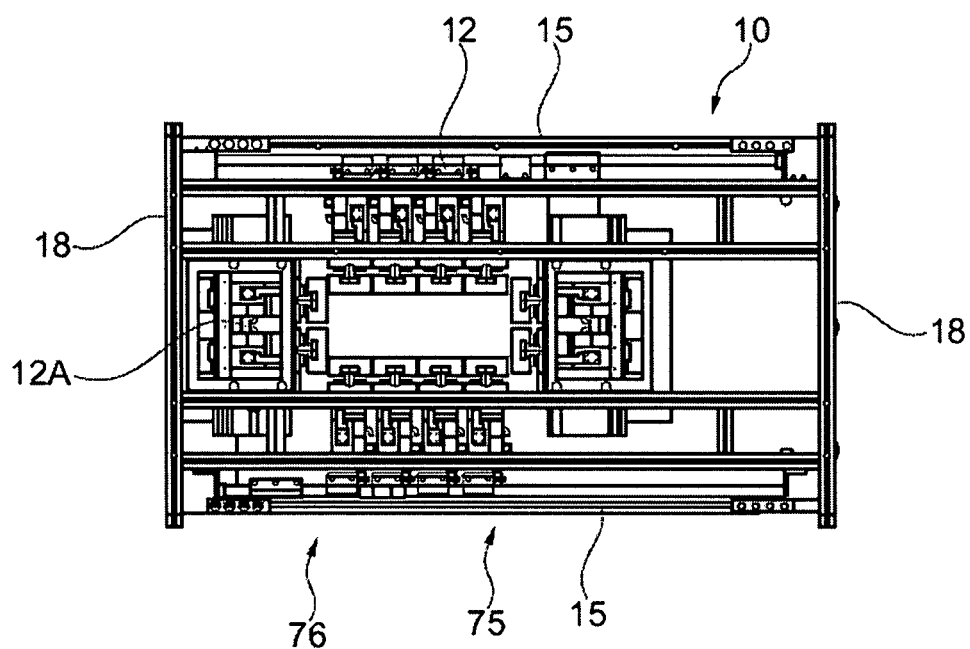
Figure 8:
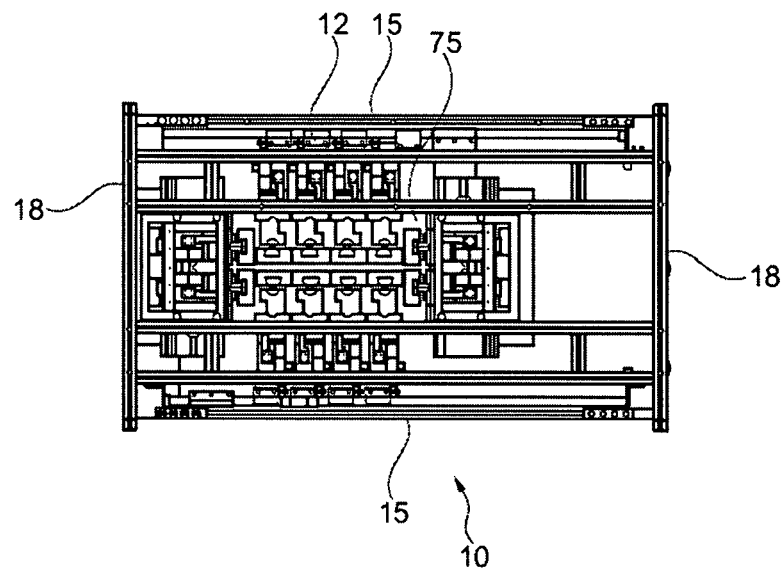
Figure 9:
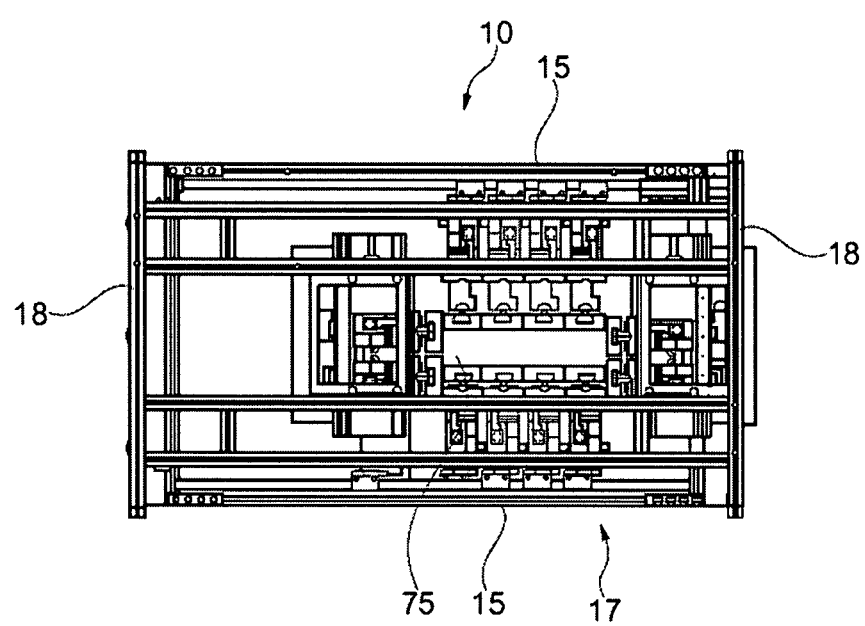
Figure 10:
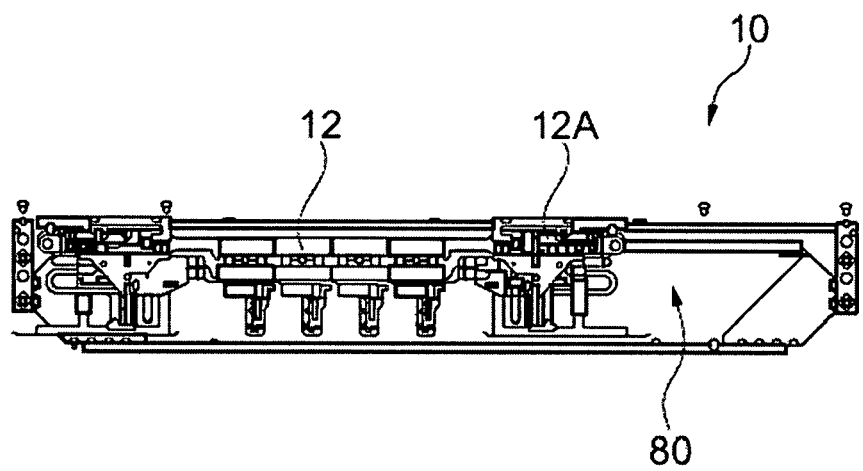

In the drawings:

FIG. 1 schematically shows a perspective view of a support frame equipped with grippers which are multiaxially movable in space and individually controllable; which support frame is additionally arranged so as to be rotatable at a bearing frame part of a device for stretching and/or shaping and/or applying a lamination of a film element;

FIG. 2 schematically shows another perspective view of the support frame shown in FIG. 1, but without the bearing frame part;

FIG. 3 schematically shows a lateral view of a gripping unit shown in FIGS. 1 and 2 with a gripper;

FIG. 4 schematically shows a perspective view of the gripping unit shown in FIG. 3 with the gripper;

FIG. 5 schematically shows a top view of the support frame shown in FIGS. 1 through 4 with a component to be laminated with the film element, which has been inserted in the device by way of example;

FIG. 6 schematically shows a top view of the support frame shown in FIGS. 1 through 5 however, alternatively, with a total of 12 grippers which are individually controllable and arranged symmetrically in a position with maximum opening;

FIG. 7 schematically shows a different top view of the support frame shown in FIG. 6 with the grippers shifted to the left;

FIG. 8 schematically shown an additional top view of the support frame shown in particular in FIG. 7, with the grippers on both long sides of the support frame deployed in addition;

FIG. 9 schematically shows an alternative top view of the support frame shown in FIGS. 6 through 8 with the grippers shifted to the right; and FIG. 10 schematically shows a lateral view of the support frame shown in FIGS. 6 through 9 during a heating process.

The in FIG. 1 only partly shown device 1 for stretching and/or shaping and/or applying a lamination of a film element 2 (see only FIG. 5 by way of example), which in this case is a film blank 3, forms a film element plane 4 and is part of a laminating station 5 which is not shown here in detail (see only FIG. 5) and of a plant 6 which is also not shown here in detail (see only FIG. 5) for laminating a component 7 (see only FIG. 5), wherein in this embodiment the component 7 to be laminated is an automotive inner lining component 8.

The device 1 is characterized in particular by a support frame 10 for clamping the film element 2 with respect to the component 7 to be laminated or with respect to a different shaping tool (not shown here) which can be arranged in the device 1.

On the support frame 10, a plurality of grippers 11 (only shown here by way of example) for gripping the film element 2 are arranged, each of the grippers 11 being part of a compact gripping unit 12 (see in particular FIGS. 3 and 4).

The particularity of the device 1 is that the grippers 11 are arranged so as to be multiaxially adjustable with respect to the support frame 10 so that the film element 2 can be adapted with more precision to a contour 7A of the component 7 to be laminated or of a shaping tool.

In particular, a well-defined sliding movement of the film element 2 during a shaping process can be performed with high precision by means of these multiaxially adjustable grippers 11 or gripping units 12.

The importance of multiaxial adjustability will in the following be explained in more detail by means of the gripping unit 12 which is shown in detail in FIGS. 3 and 4.

The support frame 10 has two interconnected longitudinal members 16 and 17 (numbered only by way of example) on both of its long sides 15. This first and second longitudinal cross-heads 16 and 17 are interconnected on the short sides 18 of the support frame 10 by means of transverse members 19 to this same support frame 10.

In this example of embodiment, the device 1 is not only characterized by the grippers 11 which are arranged so as to be multiaxially adjustable but also by an outer bearing frame part 20 (shown only partially and only in FIG. 1) in which the support frame 10 is arranged so as to be adjustable at least monoaxially around a spatial axis 16 or bearing axis, i.e., pivotal, so that the film element 2 can be adapted with more precision to the contour 7A of the component 7 to be laminated or of a shaping tool.

The outer bearing frame part 20 has two bearing units 22 (numbered here only by way of example) with bearing lugs 23 where one bearing journal 24 (numbered only by way of example) each of the support frame 10 is rotatably supported in each lug. The bearing journals 24 are each located on one transverse member 19 of the support frame 10, such that the support frame 10 is pivoted so that it can be swivelled or rotated, respectively, about its longitudinal axis, which coincides with the spatial axis 21, in the outer bearing frame part 20.

Due to this bearing mechanism, which is substantially formed by the bearing units 22, the support frame 10 at least in this embodiment has a degree of freedom 26, namely for rotation around the spatial axis 21, such that all gripping units 12 with their grippers 11, which are mounted on the support frame 10, can alter their position in space 27 and particularly with respect to the contour 7A of the component 7 to be laminated simultaneously, which helps to reduce the necessary efforts of open-loop or closed-loop control at the device 1.

It is again pointed out here that in an alternative device or for a different purpose of use, the outer bearing frame could also be used without the bearing mechanism described above.

As schematically shown in FIG. 2, the device 1 comprises a controller unit 30 by means of which in particular the multiaxial adjustability of the grippers 11 and of the support frame 10 can be controlled.

In FIG. 2, the support frame 10 is shown without the outer bearing frame part 20 and without the bearing mechanism.

In FIGS. 3 and 4, a gripping unit 12 mounted on the support frame 10 is schematically shown, again with a view to its multiaxial adjustability and the degrees of freedom resulting therefrom, for the better illustration thereof the coordinate system 32 has been introduced which is only shown in FIG. 3.

Especially the gripper 11 can be translated or displaced along a first spatial gripper axis 37 (x-axis), a second spatial gripper axis 38 (y-axis) and along a third spatial gripper axis 39 (z-axis), resulting in three degrees of freedom in terms of translation, namely a first degree 41 of freedom, a second degree 42 of freedom and a third degree 43 of freedom of the gripper 11.

In addition, the gripper can be rotated about the respective spatial gripper axis 37, 38 or 39, respectively, resulting in three rotational degrees of freedom of the gripper 11, namely a fourth degree 44 of freedom, a fifth degree 45 of freedom and a sixth degree 46 of freedom.

This multiaxial adjustability of the gripper 11 results in an individual range 50 of action of the gripper for each gripper 11 on the device 1, which range is schematically indicated in FIGS. 3 and 4.

In this embodiment, a range 50 of action for the gripper results which amounts to 80 mm×80 mm×700 mm for each gripper, where the dimensions of the range 50 of action can be selected individually for each support frame 10 and can therefore be tailor-made for each component 7 to be laminated or each shaping tool (not shown).

In this example of embodiment, the gripper 11 is characterized by an upper gripper element 51 and a lower gripper element 52, wherein the upper and the lower element 51 and 52 can be moved towards and away from each other, respectively, by a gripping mechanism which is not shown here in detail, such that the gripper 11 as a whole can perform a gripping movement with respect to the film element 2.

Gripping area components 53 and 54 are releasably mounted on the gripping elements 51 and 52, which are in direct operative contact with the film element 2 and thus exert gripping forces 55 on the film element 2.

By means of these exchangeable gripping area components, the gripper 11 can be individually adapted, if necessary, to the film material of the respective film element 2 which is to be processed.

For allowing high movability, that is adjustability or displaceability of the respective gripper 11, the device 1 comprises gripper units 12 with the following structure, whose main functions are described in the following by way of example.

The gripping unit 12 has a mechanism 60 for deploying and rotating, by means of which the gripper 11 can be translated, on the one hand, along the first spatial gripper axis 37, implementing the first degree 41 of freedom.

On the other hand, the gripper 11 can also be rotated around this first spatial gripper axis 37 by means of this same mechanism 60 for deploying and rotating, implementing the fourth degree 44 of freedom.

The fourth degree 44 of freedom guarantees that the gripper 11 is rotatable with respect to the film element plane 4.

This mechanism 60 for deploying and rotating can have many different embodiments and is located in a head portion 61 of the gripping unit 12.

Furthermore, the gripping unit 12 has a horizontal swivelling mechanism 62 with a horizontal swivel axis 63 extending in the direction of the second spatial gripper axis 38.

In this embodiment, the entire head portion 61 and thus also the mechanism 60 for deploying and rotating of the gripper 11 can be swivelled around the horizontal swivel axis 63 by means of the horizontal swivelling mechanism 62, thus allowing the fifth degree 45 of freedom.

The ability of the gripper 11 to be translated, that is, adjusted or displaced, is provided by a lifting and lowering mechanism 64 such that the gripper 11 can translated, i. e. displaced or adjusted, along the second spatial gripper axis 38. The second degree 42 of freedom described before is achieved in this manner. This degree 42 of freedom ensures that the gripper 11 can be individually adjusted in height with respect to the film element plane 4.

In addition, by means of a carriage component 65 (see FIG. 4) comprising two carriage elements 66 and 67 (see FIG. 4), the gripping unit 12 is fastened so as to be able to translate in complementary rails (not shown) of the support frame 10.

With the carriage component 13, the gripping unit 12 can be translated, that is, adjusted or displaced, along the third spatial gripper axis 39, which helps to provide the third degree 43 of freedom explained above.

In this example of embodiment, the sixth degree 46 of freedom is guaranteed by the ability of the gripping unit 12 to be swivelled around a swivel axis 68 (see FIG. 1), for which purpose the gripping unit 12 further comprises a vertical swivel mechanism (not shown here).

Cumulatively or alternatively, the sixth degree 46 of freedom can also be achieved by the rotational movement of the support frame 10 around the spatial axis 21.

Especially the sixth degree 46 of freedom guarantees that the gripper 11 can be inclined in particular with respect to the component 7 to be laminated.

In this embodiment, the spatial axis 21 and the spatial axis 21, respectively, of the support frame 10 and the third spatial gripper axis 39 extend in alignment, or in parallel, respectively, with respect to one another.

According to the previously described mechanism of the gripping unit 12 and according to its functioning, a plurality of adjusting units 70 for spatial adjustment of the grippers 11 is provided at the device 1.

It is understood that the adjusting units 70 can be controlled by motors in many different ways.

Thus, especially the respective gripping unit 12 can comprise at least one or more electric drive motors for driving the grippers 11 such that these grippers 11 can, on the one hand, be multiaxially adjusted, as explained above, and can, on the other hand, grip the respective film element 2 in an individual manner.

The gripping mechanism described above in particular can be adapted such that by means of the grippers 11, gripping forces 55 can individually be exerted on the film element 2 in order to allow, on the one hand, secure retention of the film element 2, but also a sliding of the element 2 between the gripping area components 53 and 54, if necessary.

The adjusting units 70 or the drive motors not shown here, respectively, are in direct operative contact with the controller unit 30 which is able to individually control the necessary movements of all grippers 11 and of the support frame 10 via a bus system 71 (only referenced by way of example in FIGS. 2, 3 and 4) such that the film element 2 can be processed, that is, stretched and formed, in the desired manner.

In particular, by means of the controller unit 30, the gripper 11 can also be controlled with individual timing, that is, individually accelerated etc.

In the presentations in FIGS. 6 through 10, the device 1 is shown in another state of equipment wherein one double-gripper unit 12A each is arranged on the short sides 18 of the support frame 10 instead of one individual gripper unit 12 as shown in FIGS. 1, 2 and 5.

In the presentation in FIG. 6, the device 1 is in a maximally opened symmetrical position 74 in which a maximum film element receiving space 75 has been created.

In FIG. 7, the gripping units 12 and 12A have been translated into the lower left corner 76 of the film element receiving space 75, and in FIG. 8, the gripping units 12 have been deployed on the long sides 15 of the support frame 10 in relation to their respective first spatial gripper axis 37 (see for example FIG. 3), which shows that nearly every region of the film element receiving space 75 can be accessed individually by one of the gripper units 12 or 12A.

In the presentation in FIG. 9, the gripping units 12 and 12A have been retracted, by way of example, in the lower right corner 77, with the grippers 11 on the lower long side 15 having again been retracted into the gripping units 12.

In FIG. 10, the device 1, by way of example, is in a heating phase in which the film element 2 to be stretched, formed or laminated is thermally prepared for subsequent treatment or for the subsequent laminating process by means of a heating unit 80.

At this point, it is again pointed out explicitly that the features of the solutions described in the above specification, in the Claims and/or in the Figures can also be combined, if desired, in order to implement or achieve the features, effects and advantages cumulatively.

It is understood that the embodiment described above, and in particular its deviating variations, are merely first embodiments of the device according to the invention. Therefore, the invention is not limited to this example of embodiment.

All features disclosed in the application documents are claimed as essential for the invention, provided that they are novel over the state of the art either individually or in combination.

LIST OF REFERENCE NUMBERS 1 device
2 film element
3 film blank
4 film element plane
5 laminating station
6 plant
7 component to be laminated
7A contour
8 automotive inner lining component
10 support frame
11 gripper
12 gripper unit
12A double gripper unit
15 long sides
16 first longitudinal member
17 second longitudinal member
18 short sides
19 transverse members
20 outer bearing frame part
21 spatial axis or bearing axis, respectively
22 bearing units
23 bearing lug
24 bearing journal
26 degree of freedom of the support frame
27 space
30 controller unit
32 coordinate system
36 coordinate system
37 first spatial gripper axis (x-axis)
38 second spatial gripper axis (y-axis)
39 third spatial gripper axis (z-axis)
41 first degree of freedom
42 second degree of freedom
43 third degree of freedom
44 fourth degree of freedom
45 fifth degree of freedom
46 sixth degree of freedom
50 gripper range of action
51 upper gripper element
52 lower gripper element
53 first gripping area component
54 second gripping area component
55 gripping forces
60 mechanism for deployment and rotation
61 head portion
62 horizontal swivel mechanism
63 horizontal swivel axis
64 lifting/lowering mechanism
65 carriage component
66 first carriage element
67 second carriage element
68 swivel axis
70 individual adjusting units
71 bus system
74 maximally opened symmetrical position
75 maximum film element receiving space
76 lower left corner
77 lower right corner
80 heating unit

The invention claimed is:

1. A frame in frame device for at least one of stretching, shaping or applying a film element to at least one of a component or a shaping tool, the device comprising:
an outer bearing frame;
a support frame configured to stretch, shape or apply the film element to the at least one of the component or the shaping tool and arranged within the outer bearing frame such that the support frame is at least one of monoaxially and multiaxially adjustable with respect to the outer bearing frame;
a plurality of gripper units configured to move relative to the support frame to stretch or shape the film element, the plurality of gripper units each comprising an active gripper configured to grip the film element and to translate its position relative to its gripper unit; and
wherein each of the active grippers are arranged to move relative to the gripper units so as to apply the film element to the at least one of the component or the shaping tool.

2. The device according to claim 1, wherein:
the film element defines a plane which is displaceable with respect to a bearing frame part plane defined by the outer bearing frame part; and
the outer bearing frame is further configured for supporting the support frame.

3. The device according to claim 1, wherein the support frame is adjustable in space with respect to the outer bearing frame part with at least one and up to six degrees of freedom.

4. The device according to claim 1, wherein the active grippers are adjustable in space with respect to at least one of the support frame and the outer bearing frame part with at least two and up to six degrees of freedom.

5. The device according to claim 1, wherein
the active grippers and gripper units are supported by the support frame, and
the support frame is arranged so that it can be at least one of rotated or translated in space.

6. The device according to claim 1, wherein the active grippers are configured to be actively and individually controllable.

7. The device according to claim 1, wherein the active grippers are configured to be controlled with individual timing.

8. The device according to claim 1, wherein the active grippers are configured to be tilted with respect to a plane defined by the film element.

9. The device according to claim 1, wherein the active grippers are configured to be rotated with respect to a plane defined by the film element.

10. The device according to claim 1, wherein the active grippers are configured to be individually adjustable in height.

11. The device according to claim 1, wherein the active grippers are configured to be at least one of accelerated or displaced at individual velocities.

12. The device according to claim 1, wherein gripping forces created by means of the active grippers are configured to be individually created and changed.

13. The device according to claim 1, further comprising a plurality of adjusting units configured for spatially adjusting the gripper units and/or the support frame.

14. The device according to claim 1, further comprising electric drive motors arranged for driving at least one of the gripper or the support frame.

15. The device according to claim 14, wherein the electric drive motors are arranged at the support frame.

* * * * *